Feb. 5, 1952 M. DEN OUTER 2,584,193

ALPHABETIC INDEX SYSTEM

Filed April 17, 1947 2 SHEETS—SHEET 1

INVENTOR.
M. Den Outer
BY
Glascock Downing & Seebold
ATTYS.

Feb. 5, 1952 M. DEN OUTER 2,584,193

ALPHABETIC INDEX SYSTEM

Filed April 17, 1947 2 SHEETS—SHEET 2

INVENTOR.
M. Den Outer
BY
Pennie Downing Nebola
ATTYS.

Patented Feb. 5, 1952

2,584,193

UNITED STATES PATENT OFFICE 2,584,193

ALPHABETIC INDEX SYSTEM

Marius den Outer, Rotterdam, Netherlands

Application April 17, 1947, Serial No. 742,157
In the Netherlands January 3, 1947

4 Claims. (Cl. 129—16.5)

This invention relates to an improved alphabetic index system, the elements of which, such as cards or leaves, being arranged in horizontal stepped relation.

An object of the present invention is to provide the elements of the alphabetic index system with means enabling to ascertain in an easy and efficient way, whether the elements of the said index system are placed in the correct position according to the alphabetic succession of the headings of the said elements.

According to the invention the uncovered lateral edges of the said stepped elements are provided with spaced horizontal lines, the number of the interspaces substantially corresponding with the number of characters of the alphabet, so as to enable some of the said interspaces of each element to be marked according to the initial characters of the heading of the element in question.

The spaced horizontal lines on the uncovered lateral edges of the elements or cards may be arranged in one or more (e.g. two) columns. When arranged in a single column, the said lines thus include 26 or about 26 interspaces; when spread over two columns, each column comprises 13 or about 13 interspaces. If a number of, for instance, 26 cards is placed in the card-index in correct alphabetic succession of the card-headings, the initial characters of the said card-headings being successively A, B, C. . . Z, and if now upon the uncovered lateral edge of each card a special mark is applied in the interspace which corresponds with the initial character of the card-heading, it will be evident that the said marks will appear as a line regularly stepped in one direction, when the cards are placed in the correct alphabetic succession. Should, however, a card of which the heading begins e.g. with the character P, have been placed before another card of which the initial of the heading is formed by the character O, then the regular stepped relation of the said marks would be disturbed, since the mark of the O-card would step in opposite direction with regard to the mark of the P-card. Such misplacing of the cards will thus be immediately signalised.

When the headings of a number of adjacent cards have the same initial, as will frequently occur in a card-index of some extent, a single mark is insufficient to detect incorrect alphabetic placing of the cards, since the marks of the said cards would always appear on the same level. A further object of the invention is to enable a more subtle distinction of the cards by applying also marks in the said interspaces corresponding with the second or a still further character of the card-heading. Thus in a group of A-cards (*Aa*, *Ab*, *Ac*, *Ad* . . . etc.) the marks for the second character will present a regular stepping in one direction, when the cards have been correctly placed in the card-index.

The above mentioned marks may be formed by filling up the interspace in question on the said uncovered lateral edge of the card with ink or lead-pencil, if necessary in different colours to distinguish the marks for the first character from those for the following characters of the card-heading. Or the character itself or another design may be inserted in the said interspace.

A still further object of the invention is to facilitate the marking of the correct interspaces. For this purpose the said interspaces may be designated by the corresponding characters of the alphabet and preferably also by the ordinal numbers thereof (e.g. A=1, R=18, Z=26). When the interspaces are designated by the ordinal number of the corresponding character of the alphabet, it is preferable to provide the uncovered lateral edge of the card at the top with one or more numbers corresponding with the ordinal numbers of some of the initials of the card-heading. For instance, a card "ARDEN" may bear at the said top the number-indication 1—18 corresponding with A—R; or the said indication may be 18—4 corresponding with R—D, the indication 1 for the first character being omitted or being placed somewhere else on the card. Such number-indications will considerably facilitate the insertion or putting away of cards in the correct places of the card-index.

Further objects and characteristic features of the present invention will become evident from the following description with reference to the accompanying drawings, in which some preferred embodiments of the invention have been diagrammatically illustrated by way of example.

Figure 1:
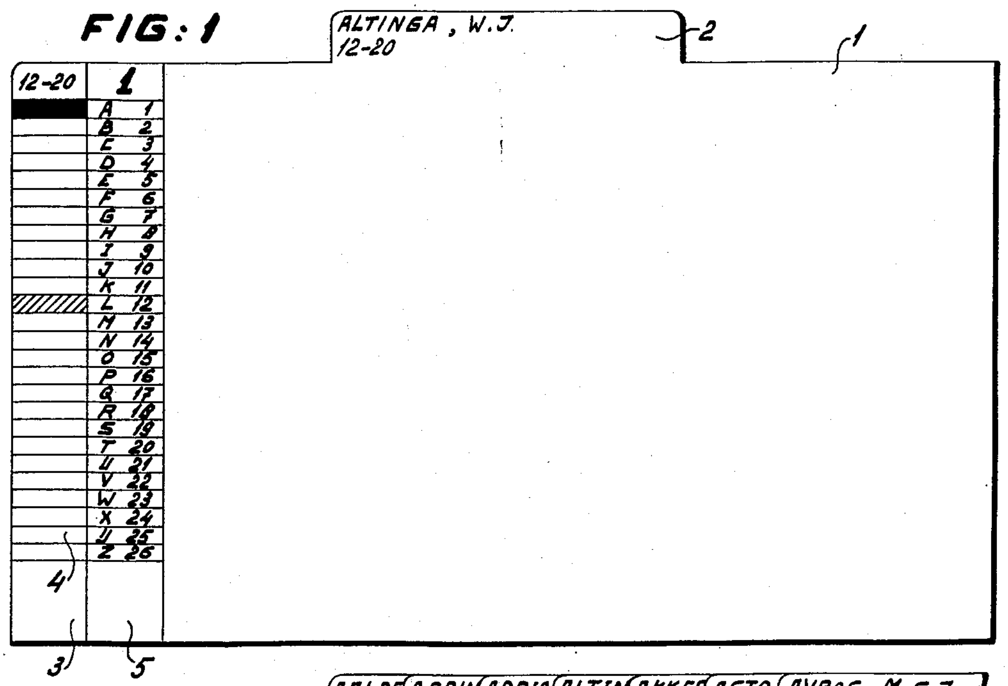
Fig. 1 is a front view of a card with means for alphabetic checking according to the invention.

In the drawings the cards 1 have been carried out with horizontal taps 2 in the manner as described in my copending application Serial No. 742,156, filed April 17, 1947, now abandoned and entitled: "Improvements in index systems, the elements of which being arranged in stepped relation." These tabs 2 are intended to bear the superscription or heading of the card. As appears from Figs. 2 and 4, the cards 1 are so positioned in the card-index as to overlap each other in horizontal direction. Thereby the left-hand edge 3 of each card 1 remains uncovered, this edge being provided with a plurality of spaced horizontal lines.

Figure 2:
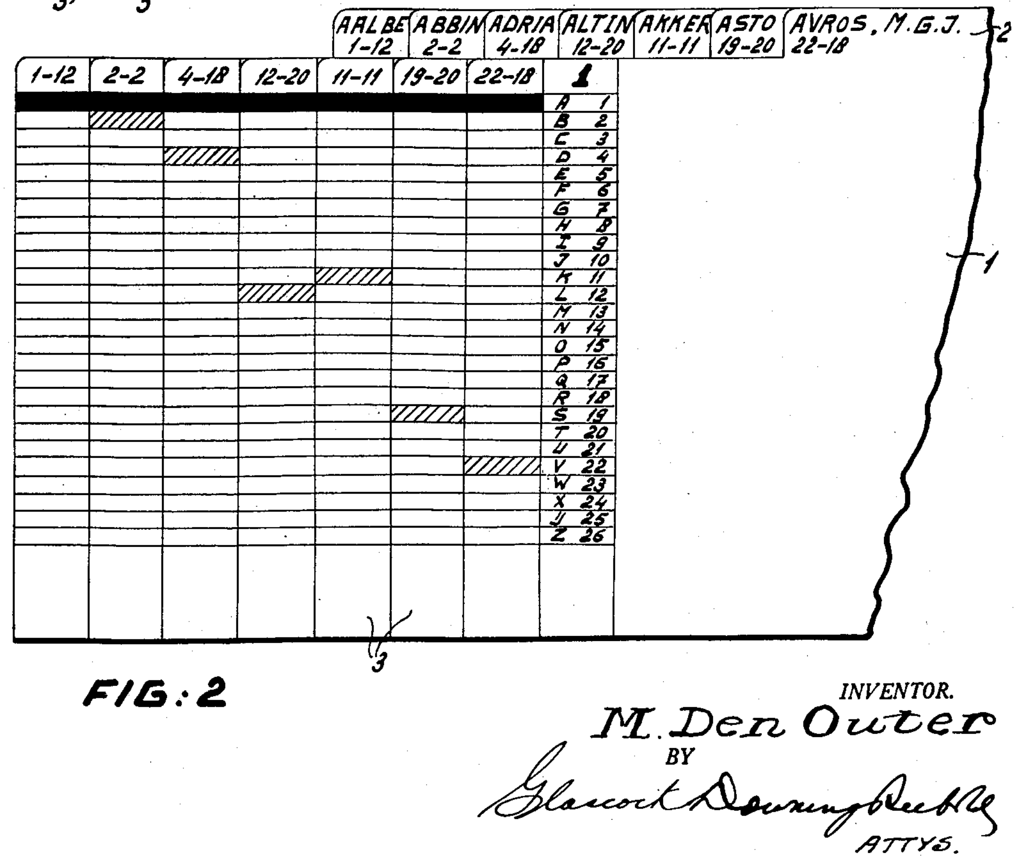
Fig. 2 shows a set or row of stepped cards according to Fig. 1.

In the embodiment according to Figs. 1 and 2 the lateral edge 3 comprises so many lines in a single column that a number of twenty-six interspaces 4 is formed, thus corresponding with the number of characters of the alphabet. Adjacent to the lateral edge 3 the card is provided with a column 5 showing the different characters of the alphabet and the ordinal numbers thereof. This enables to determine easily and rapidly, to which character of the alphabet each interspace 4 belongs. Thus the first interspace from above has been indicated by A 1, the second by B 2, the fifteenth by O 15, etc.

The card illustrated in Fig. 1 bears the heading "ALTINGA, W. J." on the tab 2. It will be seen that for this card the first and the second character of the heading have been designated in a special manner on the lateral edge 3 of the card. The first interspace 4 from above (A) has been blackened and the twelfth interspace (L) hatched. Moreover, at the top of the column 3 a number-indication "12—20" has been inserted. The meaning thereof is that the second character (L) of the heading corresponds with the 12th and the third character (T) of the heading corresponds with the 20th character of the alphabet. The top of the column 5 bears the number-indication "1"; this means that the first character of the heading (A) corresponds with the 1st character of the alphabet.

In Fig. 2 seven cards stepped in horizontal direction have been illustrated. The headings of these cards are in succession: AALBERSE, ABBINK, ADRIAAN, ALTINGA, AKKERMAN, ASTOPIA and AVROS. All these headings have the character A as initial and consequently the blackened interspaces in the lateral edges 3 indicating the first character of the heading appear on a straight horizontal line (vide Fig. 2). The hatched interspaces indicating the second character of the card-headings, however, will form a stepped line. If all the cards are placed in correct alphabetic succession there will be obtained a regular stepping in downward direction from left to right. Fig. 2 shows, however, that one of the seven cards has been misplaced, because the hatched interspace in the fourth lateral edge is on a lower level than that in the fifth lateral edge and consequently the regular stepping has been disturbed. Indeed, the card ALTINGA should have been placed after instead of before the card AKKERMAN. Moreover, this misplacing may be ascertained by the number-indications at the top of the columns 3 (11—11 stands after instead of before 12—20).

The said number-indications further greatly facilitate the placing of new cards between a series of present cards. Supposing a new card ACKER has to be inserted; the number-indication of this card being 3—11 (C—K), it will be seen immediately that this card ought to be placed between the cards 2—2 (ABBINK) and 4—18 (ADRIAAN).

It is, of course, possible to divide the lateral edge 3 by means of a vertical line in two columns, each of which comprising twenty-six interspaces 4. The indication for the first character (black interspace) may then be put down in the first column, whereas the second column is destined for the indication of the second character (hatched interspace).

In order to save room, it will be possible to make use of a smaller number of spaced horizontal lines in the said lateral edge 3 by destining definite interspaces for more than one character, such as may be e. g. the case for the characters I, J or P, Q or X, Y, etc.

Figure 3:
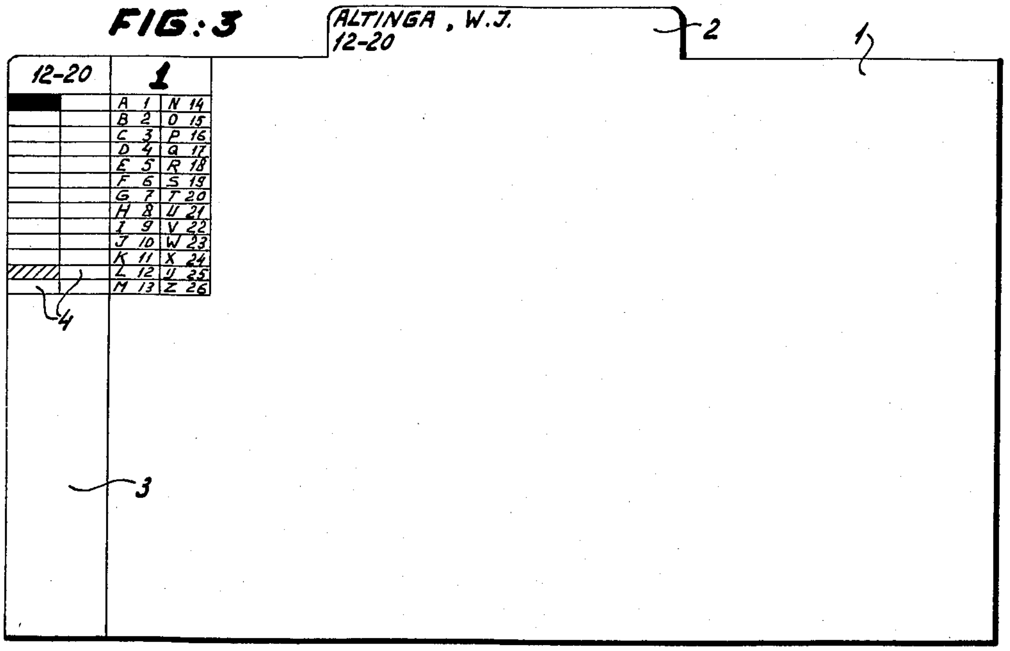
Fig. 3 shows another embodiment of a card with alphabetic checking means.
Figure 4:
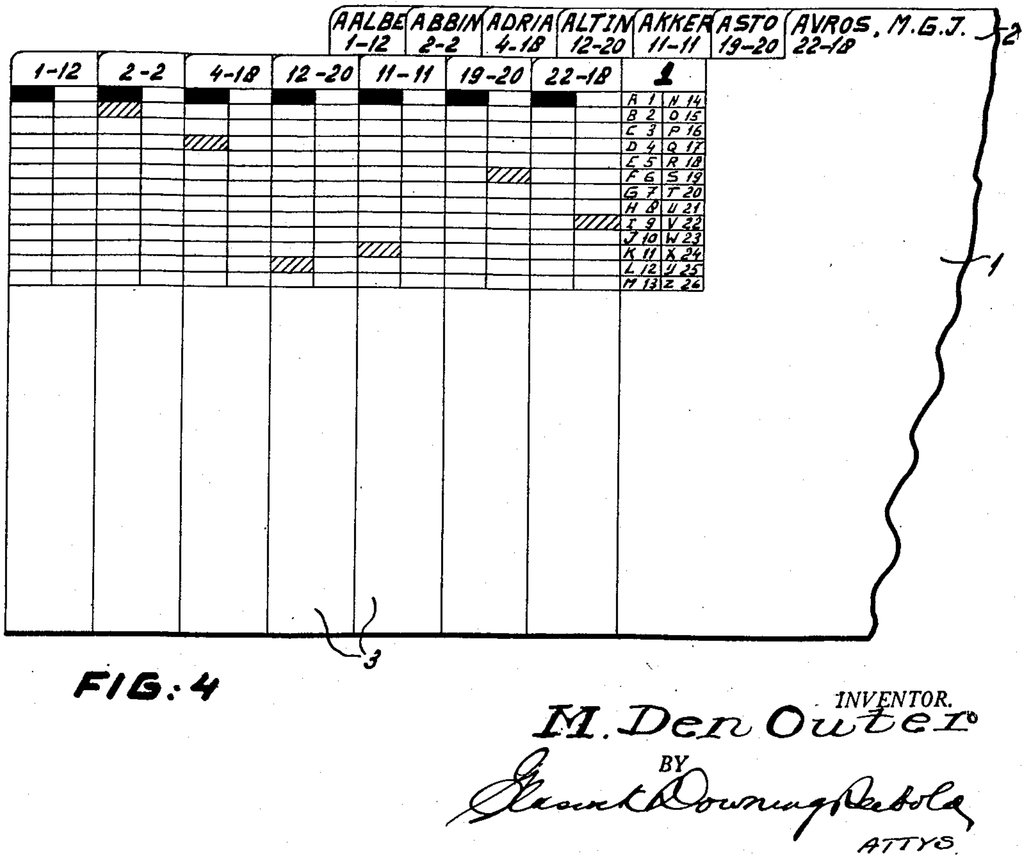
Fig. 4 illustrates a set of stepped cards according to Fig. 3.

In this connection it is also possible to execute the cards according to Figs. 3 and 4, in which the lateral edge 3 has been provided with two columns, each comprising only thirteen interspaces 4. In Fig. 4 the same set of cards as in Fig. 2 has been illustrated, and also with this embodiment of the invention any misplacing of the cards can be easily ascertained.

As has already been stated before, instead of filling up or hatching the interspaces, also other designations may be used to indicate the characters of the card-headings. For instance, the character or characters to be indicated may be inserted in the interspace in question. Thus the card with the heading ALTINGA may be provided e. g. with the characters LT in the twelfth interspace. Special colours may be used to fill up or designate the said interspaces. The number-indications may also be put down on the tabs, as has been represented in the drawings. Furthermore, it is possible to mention on the card the ordinal numbers of still more characters and, if desired, of the initials of the name in question.

It will be evident that the cards may be provided at their lower edge with notches, incisions, apertures or the like, by means of which the cards may be stuck upon guiding rods or similar guiding members near the bottom of the card-box. Moreover the tabs may be omitted and the headings may occur on another convenient place of the cards.

What I claim is:

1. An alphabetic vertical index system comprising a plurality of groups of vertically disposed similarly shaped index elements each having a uniformly shaped tab projecting above its upper edge at an area spaced from its side edges said tab being provided with headings to identify the individual elements, the elements of each group being arranged in laterally equal offset relation and in alphabetical order of their headings, thereby exposing an equal lateral marginal area of each underlying card one of the lateral margins of each of the said elements having a number of appropriately designated adjacent indicia receiving columns each including spaced horizontal lines, the interspaces between the lines being successively indicated in at least one of the said columns by the letters of the alphabet to facilitate proper filing of the elements.

2. An alphabetic vertical card register comprising a plurality of groups of vertically disposed similarly shaped index cards each having a uniformly shaped tab projecting above its upper edge at an area spaced from its side edges said tab being provided with headings to identify the individual cards, the cards of each group being arranged in laterally equal offset relation and in alphabetical order of the card headings, thereby exposing an equal lateral marginal area of each underlying card one of the lateral margins of each of the cards having a number of appropriately designated adjacent indicia receiving columns each including spaced horizontal lines, the interspaces between the lines being successively indicated in at least one of the said columns by the letters of the alphabet and index mark means in at least some interspaces in at least one of the other columns including marks arranged according to the initials of the heading of the card in question whereby filing of the cards is facilitated and misplaced cards are readily apparent.

3. An alphabetic vertical card register as defined in claim 2, wherein the interspaces of each column bearing the letters of the alphabet are also provided with the corresponding ordinal numbers corresponding with the said letters of the alphabet.

4. An alphabetic vertical card register as defined in claim 2, wherein each column bearing the marks corresponding to the initials of the card heading is arranged in the margin of each card which is exposed by the adjacent offset card, whereas each column bearing the letters of the alphabet is covered by the said adjacent offset card.

MARIUS DEN OUTER.

REFERENCES CITED

The following references are of record in the file of this patent:

UNITED STATES PATENTS

| Number | Name | Date |
|---|---|---|
| 982,662 | Dunn | Jan. 24, 1911 |
| 1,317,392 | Ringler | Sept. 30, 1919 |

FOREIGN PATENTS

| Number | Country | Date |
|---|---|---|
| 486,328 | Germany | Nov. 15, 1929 |
| 120,681 | Austria | Jan. 10, 1931 |
| 420,945 | Great Britain | Dec. 11, 1934 |
| 662,802 | Germany | July 21, 1938 |